Sept. 24, 1929. F. MIADOWICZ 1,729,004
DISPLAY FIXTURE
Filed April 8, 1926
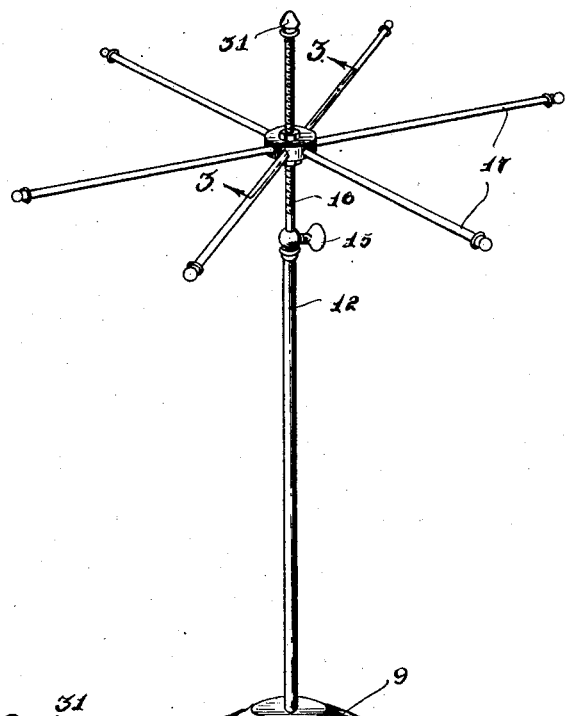
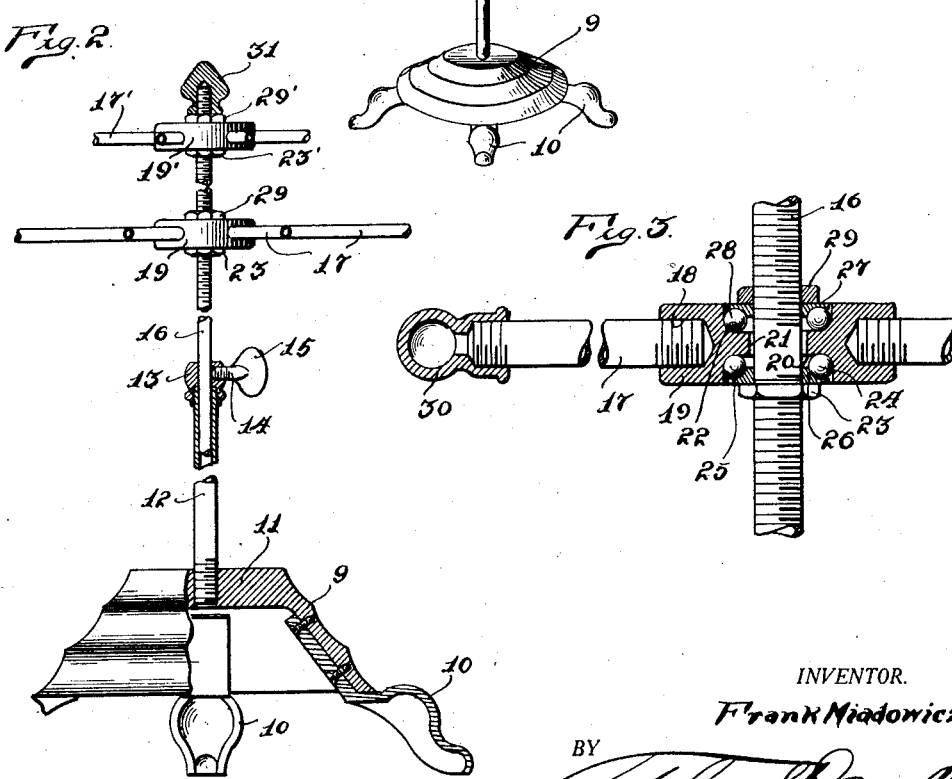
INVENTOR.
Frank Miadowicz
BY
ATTORNEY.

Patented Sept. 24, 1929

1,729,004

UNITED STATES PATENT OFFICE

FRANK MIADOWICZ, OF DETROIT, MICHIGAN, ASSIGNOR OF ONE-HALF TO JAMES E. MORROW, OF DETROIT, MICHIGAN

DISPLAY FIXTURE

Application filed April 8, 1926. Serial No. 100,498.

My invention relates to a new and useful improvement in a display fixture adapted for use in displaying various articles, such as umbrellas, wearing apparel and articles which are for sale generally as staple commodities.

It is an object of the present invention to provide a display fixture of this class which will be simple in structure, economical of manufacture and highly efficient in use.

Another object of the invention is the provision of a display fixture adapted for positioning in a corner or other restricted place.

Another object of the invention is the provision in a display fixture of this class of a threaded supporting member for supporting a plurality of sets of display arms rotatable about the supporting member.

Other objects will appear hereinafter.

The invention consists in the combination and arrangement of parts hereinafter described and claimed.

The invention will be best understood from a reference to the accompanying drawings which form a part of this specification and in which, Fig. 1 is a perspective view of the invention.

Fig. 2 is a side elevational view of the invention with parts broken away and parts in section showing two sets of supporting arms.

Fig. 3 is a fragmentary sectional view taken on substantially line 3—3 of Fig. 1.

As shown in the drawings the invention comprises a base 9 having a plurality of supporting legs 10 mounted thereon. This base 9 and the supporting legs 10 may of course be of any desired design or type.

Threaded into the top 11 of the base 9 is a pipe 12 secured to the upper end of which is a cap 13 in which is threaded a set screw 14 carrying the thumb piece 15, said set screw 14 being adapted upon threading into the cap 13 to engage the rod 16 which is threaded throughout a large portion of its length projecting upwardly from the cap 13.

A plurality of display arms 17 are threaded into sockets 18 formed in a holder 19 through which the rod 16 is projected, the holder 19 having a pocket 20 formed at one side of the opening 21, through which the rod 16 is projected and a pocket 22 at the other side of said opening 21. A nut 23 serves to prevent downward movement of the holder 19 on the rod 16, the opening 21 being of larger diameter than the diameter of the rod 16 so as to provide space between the inner surface of the opening 21 and the periphery of the rod 16. Positioned in the pocket 20 are ball bearings 24 which engage against a curved surface 25 formed on the washer 26 which projects slightly inwardly of the pocket 20 and is held in this position by the nut 23. A similar washer 27 serves to engage ball bearings 28 positioned in the pocket 22, a nut 29 serving to engage this washer 27 and retain it in engagement with the ball bearings 28.

It is evident that the nuts 23 and 29 determine the position of the holder 19 longitudinally of the rod 16. This rod 16 is slidable in the pipe 12 so that it may be telescoped in the pipe 12 any desired distance, the set screw 14 serving to lock it in fixed relation to the pipe 12. Each of the arms 17 is provided with a head 30, which in addition to serving as an ornament covers the end of the arm 17 and eliminates any sharp edges from the free end of the supporting arm 17. A cap 31 is threaded on the upper end of the rod 16.

The holder 19 is rotatable about the rod 16, the ball bearing element permitting the easy and free rotation of this holder about the rod 16.

It is apparent that when the device is used in the form illustrated in Fig. 1 that the arm 17 may be used to support garments, umbrellas or other articles and that access to the various articles on the fixture is easy as the arms may be rotated about the rod 16.

If it is desired to place the rack in a restricted space such as in a corner or against a wall a portion of the arms 17 may be threaded out of the holder 19 to permit such an arrangement.

In Fig. 2 I have shown the rod 16 provided with the holder 19 having the arms 17 thereon and also provided with a second holder 19' provided with the arm 17', the nuts 23' and 29' serving the function already mentioned as being the function of the nuts 23 and 29. It is believed evident that as many of the holders 19 as desired may be on the rod 16 depending upon the length of the rod 16 and the nature of the articles intended to be hung from the arms 17.

The display fixture set forth is one which is most efficient in use, serving a large number of purposes and permitting its use in various locations particularly where the space is restricted. For the effective display of the goods it functions well.

Another feature of the device is that it may be packed into a very small space for shipping and easily and quickly assembled in operative position by unskilled persons.

While I have illustrated and described the preferred form of structure, I do not wish to limit myself to the precise form of structure shown, but desire to avail myself of such variations and modifications as come within the scope of the appended claims.

Having thus described my invention what I claim as new and desire to secure by Letters Patent is:

1. A display fixture of the class described comprising: a base; a tubular supporting member projecting upwardly from said base; a supporting member slidably mounted in said tubular member and threaded for a substantial distance adjacent its upper end; means for fixing said slidably mounted supporting member relatively to said tubular member; a plurality of arms; a holder for carrying said arms, said holder being positioned in embracing relation about the threaded portion of said slidably mounted supporting member and rotatable thereon; means threaded on said supporting member at opposite sides of said holder for preventing longitudinal movement of said holder relatively to said slidably mounted supporting member, said arms being independently detachable from said holder and said preventing means permitting the adjustment of said holder in any desired position on said slidably mounted supporting member within predetermined limits.

2. A display fixture of the class described comprising a base; a tubular supporting member projecting upwardly from said base; a supporting member slidably mounted in said tubular member; means for fixing said slidably mounted supporting member relatively to said tubular member; a holder positioned loosely on said supporting member and adapted for axial and rotative movement thereon; a plurality of arms projecting outwardly from said holder and means for locking said holder against axial movement on said supporting member and non-interfering with the rotation of said holder on said supporting member.

3. In a display fixture of the class described a supporting member having its periphery threaded; a holding member positioned on said supporting member rotatively and axially movable thereon; supporting arms projecting outwardly from said holding member, said supporting member projecting through said holding member; and means for locking said holding member against axial movement on said supporting member and non-interfering with rotative movement of said holding member on said supporting member and retaining said supporting member spaced from said holding member.

4. In a display fixture of the class described, a supporting member having its periphery threaded; a holding member positioned on said supporting member rotatively and axially movable thereon; supporting arms projecting outwardly from said holding member, said supporting member projecting through a central opening in said holding member, said holding member having at its opposite sides around said opening a recess of larger diameter than said opening; a plate mounted in each of said recesses and provided with an opening for the projection of said supporting member therethrough; ball bearings positioned in said recess and engageable with the inner surface of said plates adjacent the periphery thereof, there being grooves formed in the engaging portion of said plates; and a pair of nuts each threaded on said supporting member at opposite sides of said holding member for locking said holding member against axial movement on said supporting member and non-interfering with the rotation of said holding member.

In testimony whereof I have signed the foregoing.

FRANK MIADOWICZ.